Figure 1:
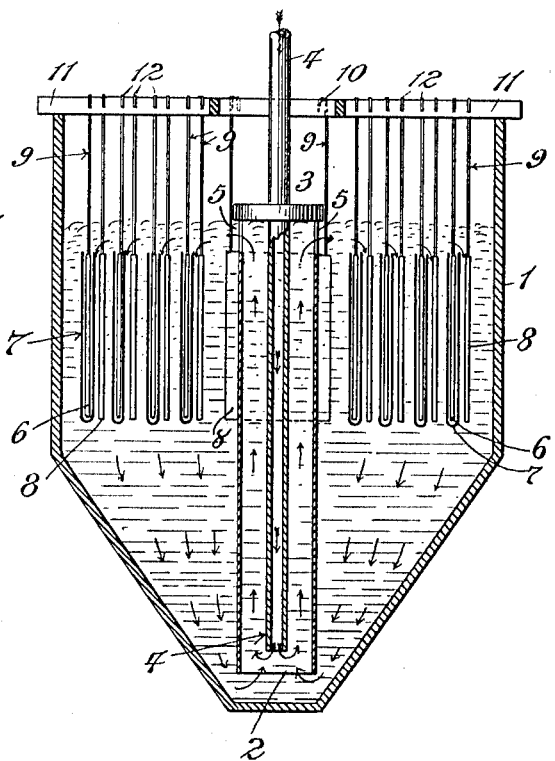

J. H. ROBERTSON.
METHOD OR PROCESS OF AND APPARATUS FOR EXTRACTING METALS FROM THE ORES THEREOF.
APPLICATION FILED OCT. 12, 1910.

1,001,449.  
Patented Aug. 22, 1911.

Witnesses:  
Edward Rowland  
M. F. Keating

Inventor  
James Hart Robertson  
By Attorney  
Charles J. Kintner

UNITED STATES PATENT OFFICE.

JAMES HART ROBERTSON, OF NEW YORK, N. Y., ASSIGNOR TO UNIVERSAL ORE REDUCTION COMPANY, OF PHOENIX, ARIZONA TERRITORY, A CORPORATION OF ARIZONA TERRITORY.

METHOD OR PROCESS OF AND APPARATUS FOR EXTRACTING METALS FROM THE ORES THEREOF.

1,001,449.   Specification of Letters Patent.   Patented Aug. 22, 1911.

Application filed October 12, 1910.   Serial No. 586,607.

*To all whom it may concern:*

Be it known that I, JAMES HART ROBERTSON, a citizen of the United States, and resident of New York, borough of Manhattan, county and State of New York, have made a new and useful Invention in Methods or Processes of and Apparatus for Extracting Metals from the Ores Thereof, of which the following is a specification.

My invention is directed particularly to a novel method or process of and apparatus for extracting metals electrolytically from powders of the ores thereof suspended in an electrolytic solution, and it has for its objects—first, to effect such electrolytic action through the agency of an electrolyte having a powder of an ore held in suspension and positive and negative elements or plates suspended therein and adapted to effect the deposition of the metal upon one of the elements or plates through the agency of the circulating electrolyte, the effective electrical current being generated solely by or through the action of said circulating electrolyte as it moves or passes between the elements or plates. Second, to effect the electrical deposition of a metal held in suspension in an electrolyte upon the negative element or plate through the agency of the circulation of the electrolyte in which the plates are suspended, and means for effecting such circulation. Third, to effect the deposition of a metal held in suspension in an electrolyte upon one of two elements or plates suspended therein through the agency of heat as applied to the electrolyte in such manner that the same will cause the electrolyte to circulate freely between the elements or plates by the joint action of heat and gravity.

I have discovered that if two conducting element or plates be suspended in a vessel containing an electrolyte of water with a powder of a metal, such as copper, held in suspension therein, and if such electrolyte be agitated in such manner as to cause the suspended powder to pass freely between the elements or plates, where such elements or plates are connected in short circuit above the electrolyte, there will result a deposit of the metal upon one of the elements or plates, dependent upon the direction of the flow of the electric current, thereby effecting a practical result of this nature without the agency of any extraneous source of electrical energy, such as has heretofore been used in this art, and in the application of this generic principle is found the essence of my invention. The elements or plates used by me in the practice of my novel method are preferably composed, the positive element or plate of iron and the negative element or plate of copper, the electrolyte being of water, and also preferably a mineral acid, such for instance as sulfuric acid, although I have ascertained that some of the organic acids, such, for instance as acetic acid, give fair results.

In the practice of my invention, where the elements or plates are respectively of iron and copper with an electrolyte of water and sulfuric acid, I have ascertained that the iron is electro-positive to the copper. However, should other solutions be used containing, for instance, cyanid of potassium, the copper would be more electro-positive than the iron. Obviously other metals or electrical conductors than iron and copper which are respectively electro-negative and electro-positive to each other may be used, such matters being well within the skill of those versed in the electric art.

I am aware that it is not broadly new to generate currents of electricity by immersing unlike or dissimilar materials in an electrolyte; and also that it is old to electroplate articles by what is known as the single cell process. I am also aware that it is old to precipitate copper from a solution by means of iron, and I make no claim hereinafter broad enough to include the application of these principles herein disclaimed.

Figure 2:
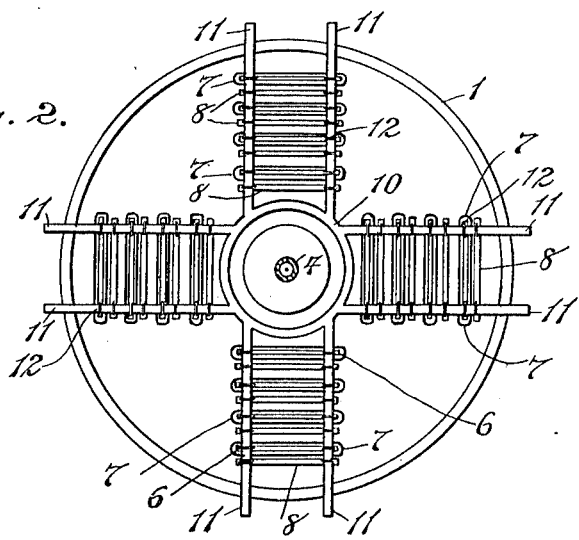

For a full and clear understanding of my invention, such as will enable others skilled in the art to practice the same, reference is had to the accompanying drawings, in which, Figure 1 is a vertical sectional view of an apparatus illustrating the application of my novel principle; and Fig. 2 is a plan view as seen looking at Fig. 1 from the top toward the bottom of the drawings.

Referring to the drawings in detail 1 represents in sectional view a vat or chamber, preferably conical in form at its bottom, for conveying the settling powders of the ore to its axial diameter.

2 is a vertically disposed tube located axially with relation to the chamber or vat and having a deflecting top 3 through which there extends a hot air or steam conveying pipe 4; 5, 5 being radially disposed openings under the top 3 so arranged that the lower surface of the top will act as a deflector, there being four such openings diametrically disposed in pairs with relation to each other.

6 and 8 are elements or plates which are supported in pairs, by vertically disposed conductors 9, 9, having hooks 12 at their upper ends, from parallel suspending arms 11, 11, integral with a central supporting ring 10, said arms and ring being cut or stamped out of a relatively strong sheet of copper so that they constitute good conductors for electrically connecting the vertically disposed conductors 9, 9. All of the elements or plates 6, 6 are preferably of iron and covered with canvas or equivalent thin porous insulating bags 7 for preventing actual electrical contact between said elements 6 and the adjacent parallel elements 8; also for preventing particles of iron, should they become disintegrated from the elements or plates 6, from entering the electrolyte. These pairs of elements or plates are suspended in the electrolyte as before stated in the manner shown in both figures of the drawings, so that each pair is practically short-circuited through the conductors 9, 9, the hooks 12, and the common copper supporting arms 11.

The operation is as follows:—The necessary amount of water required to completely cover all of the elements or plates and containing the proper amount of acid for the charge of ore to be treated is first introduced in the vat or chamber, the proportions of acid and water necessarily varying with the nature of the powdered ore to be treated. Steam is then turned on through the pipe 4, descending as illustrated by the tailed arrows and ultimately passing out at the bottom thereof into the vertically disposed tube 2 at a point near its bottom. It will be understood that by reason of the weight of the liquid in the vat or chamber 1 at the bottom the steam will immediately reverse its direction of movement and pass upward in the direction of the tailless arrows and outward through the openings 5, 5 and downward in the manner shown to points above the respective pairs of elements or plates, finally descending to the bottom in the manner illustrated by the tailless arrows. As soon as the water is sufficiently heated powdered ore is supplied in the desired proportions and by reason of the continuous action of the steam in the manner already described and as illustrated in the drawings the powder is caused to continuously ascend and be distributed over or above the pairs of elements or plates, descending by gravity in the manner shown. As the powdered ore passes downward between these elements or plates, as, for instance, powdered copper ore, an electrical current is set up from the iron element or plate 6 through the electrolyte to the copper element or plate 8, upward through one of the supporting conductors 9, and thence back to the other supporting conductor 9, through the copper suspending arm 11, each one of the individual pairs of such elements or plates suspended in the manner shown in the drawings acting in this manner, so that there is constantly being effected an actual electrolytic deposition of copper upon the negative or copper element or plate 8 of all of the pairs of such elements carried or sustained by the supporting arms 11—11, 11—11, 11—11, 11—11, as shown in Fig. 2.

The negative elements or plates 8 are preferably made of light copper foil and the process is continued until a test of the solution gives evidence of the fact that all of the metal has been deposited on the copper plates, when the solution may be siphoned off into a filtering tank and the copper elements or plates are sprayed with water, after which they are again ready to be used with another solution and batch or charge of powdered ore. This process is continued in this manner successively until it is found desirable to withdraw or remove the copper elements or plates and subject them to the melting pot, when fresh elements of copper foil may be substituted therefor and the process continued indefinitely.

Although I have illustrated the vertically disposed method of effecting the movement of the electrolyte by which the injected steam causes the powdered ore in suspension to pass upwardly and outwardly and ultimately descend by gravity, it is to be understood that I do not limit myself to such method as obviously any method of effecting the movement of the solution which would cause it to pass between the elements or plates may be employed. As, for instance, horizontal or spiral movement may be effected in any well known way, one of the essential features of my invention being the continuous successive movement of the powder held in suspension between the elements or plates and in such manner as to obtain the best effect. I have succeeded in obtaining remarkably good effects with the apparatus as disclosed in the drawings.

I make no claim *per se* to the agitating apparatus embraced in the tubes 2 and 4 and the top or deflector 3, my claims in so far as the structural apparatus is concerned being limited only to the combination of such agitator with the suspended short circuited elements or plates.

I desire to have it understood that my invention may be utilized or applied in connection with metals generally which are adapted to be acted upon electrolytically and deposited upon an electric element or plate.

Having thus described my invention what I claim and desire to secure by Letters Patent of the United States is—

1. A method of extracting a metal from an ore thereof, consisting in causing a liquid solution containing a powder of such ore to be subjected to the electrical effect of a plurality of short circuited conducting elements or plates immersed in the solution.

2. A method of extracting a metal from an ore thereof, consisting in causing a liquid solution containing a powder of the ore to be simultaneously subjected to the agitating effect of steam and an electrolytic effect due to the movement of the solution between short circuited conducting elements or plates immersed in the solution.

3. A method of extracting a metal from an ore thereof which consists in simultaneously subjecting a liquid solution containing a powder of the ore to an agitating effect and an electrical current resulting from the combined influence of such agitating effect and the continuous action of gravity.

4. A method of extracting a metal from a powdered liquid solution of an ore thereof, consisting in utilizing heat and gravity to cause the solution to flow continuously between short circuited conducting elements or plates immersed in the solution, whereby an electrical current is caused to flow from a positive element to a negative element and deposit the metal upon the latter.

5. A method of electrically extracting a metal from a solution containing a powder of an ore, consisting in causing the continuous circulation of the solution between two conducting surfaces to set up or establish an electrical current which causes the pure metal to be deposited upon one of the surfaces and permits the tailings to remain in the solution.

6. Apparatus for extracting a metal from the powder of an ore thereof, embracing a liquid containing vat or chamber, a plurality of relatively closely related conducting elements or plates electrically connected together in pairs; in combination with means for securing them in short circuited relation in a liquid solution of a powder of the ore in the vat or chamber, substantially as described.

7. Apparatus for extracting a metal from the powder of an ore thereof, embracing a vat or chamber, one or more pairs of conducting elements or plates electrically connected in short circuited relation, and means for causing the liquid solution to move continuously between the elements or plates, substantially as described.

8. Apparatus for extracting a metal from the powder of an ore thereof, embracing a vat or chamber, one or more pairs of conducting elements or plates electrically connected in short circuited relation; together with heat generating means adapted to establish a continuous flow of the solution between the elements or plates, substantially as described.

9. Apparatus for extracting a metal from the powder of an ore thereof, embracing a vat or chamber, one or more pairs of supported elements or plates located therein and connected together electrically in short circuit relation; in combination with means for causing a heated upward and outward flow of the solution due to the heat, and a downward flow thereof by gravity between the elements or plates, whereby the metal is continuously electrolytically deposited upon one plate of each of said pairs of plates, substantially as described.

10. Apparatus for extracting a metal from a powder of an ore thereof, embracing the following elements: a vat or chamber; one or more pairs of electrical conducting elements or plates connected each in short circuit relation and adapted to be immersed in a liquid solution of a powder of the ore; heating and deflecting means for continuously heating the solution so as to cause it to ascend centrally in the chamber and then be deflected radially over the pairs of elements or plates, whereby as the solution passes downward between said plates the metal is deposited on one plate of each pair thereof, substantially as described.

11. Apparatus for extracting a metal from the powder of an ore thereof, embracing a vat or chamber, a pair of electrical conducting elements or plates adapted to be immersed in a liquid solution of the powder in the chamber, and a porous insulating medium located between the plates, said plates being electrically connected together in short circuit relation, substantially as described.

12. Apparatus for extracting a metal from the powder of an ore thereof, embracing a vat or chamber, a pair of electrical conducting elements or plates adapted to be immersed in a liquid solution of the powder in the chamber, and a porous insulating medium located between the plates, said plates being electrically connected together in short circuited relation; in combination with means for conveying a heated vapor or gas upward through the solution, and additional means for deflecting said liquid solution as it approaches the top level thereof above the plates, so that as the powdered ore descends under the action of gravity it is acted upon electrically and the metal deposited on one of the plates, substantially as described.

In testimony whereof I have signed my name to this specification in the presence of two subscribing witnesses.

JAMES HART ROBERTSON.

Witnesses:
BARTON B. WARD,
C. J. KINTNER.

Copies of this patent may be obtained for five cents each, by addressing the "Commissioner of Patents, Washington, D. C."